Patented July 11, 1933                                         1,917,273

UNITED STATES PATENT OFFICE

MARVIN C. REYNOLDS, OF CHICAGO, ILLINOIS

METHOD FOR MANUFACTURING MARGARINE

REISSUED

No Drawing.          Application filed April 9, 1931.   Serial No. 528,984.

My invention relates to a new method of manufacturing margarine. It relates more in particular to a method by means of which margarine can be manufactured much more directly and economically than by methods heretofore employed.

Methods for manufacturing margarine heretofore employed are in general substantially the same throughout the industry. The method consists briefly in churning oleaginous media which have been made liquid by the application of heat, with aqueous media, usually milk, until a liquid emulsion is formed in which the oil and fat ingredients constitute the continuous phase and the aqueous ingredients the disperse phase. This emulsion is then chilled or crystallized by bringing it into contact with a colder medium, for example, a refrigerated drum, cold water or the, like. This solidifies the emulsion by quickly reducing it to a temperature approaching 35 degrees Fahrenheit, or sometimes colder. In this condition the margarine is not sufficiently plastic and its texture and other characteristics are not suitable for uses to which the product is put. The solidified emulsion must be further worked, but before doing this it is necessary to raise the temperature by tempering processes, of which processes several are commercially used. The working of the margarine is carried out on various kinds of equipment such as so-called table butter workers, corrugated rolls, or other mechanical devices, which are employed to work excessive moisture out of the product, and to knead the crystallized emulsion into a continuous, butter-like mass. The margarine may then be further kneaded in machines with Z type agitators, not unlike bread dough mixers, for the purpose of blending in milk, flavor or preserving materials such as salt and sodium benzoate into the product.

The principal object of my present invention is to simplify the manufacture of margarine.

Another object is the provision of a margarine manufacturing process which will render one or more of the steps heretofore employed obsolete and unnecessary.

Another object is to avoid the churning and emulsifying steps in margarine manufacture, which steps require considerable time, equipment and floor space and so increase greatly the cost of margarine manufacture.

Another object is to lessen the cost of manufacture of the margarine by effecting a saving of materials, principally of milk.

Another object is to improve the flavor while using a smaller amount of milk.

In general my invention consists in directly "blending" together the oleaginous constituents in compounded and crystallized but plastic form with the aqueous constituents of margarine, usually cultured milk. Other ingredients of margarine can be incorporated at the same time and to obtain the best results I preferably use an improving substance, which, in the case of margarine and in the action described, will function as an emulsifying agent.

Other objects and features of the invention will be apparent from a consideration of the following detail description.

In carrying out the invention in a practical commercial way, I select oils and fats suitable to the type of margarine which is to be manufactured, bring them to a temperature at which they are melted to a clear liquid, crystallize them, as for example on a refrigerated lard roll, temper them to a substantially plastic but still solid condition and introduce them into suitable blending apparatus such as a kneading and mixing machine, or margarine blender, or similar piece of equipment. At the same time I introduce a suitable amount of cultured milk or other aqueous constituent of the margarine and then operate the apparatus to work the oleaginous and aqueous constituents together by a kneading or mixing action, or an action which will tend to produce an intimate inter-mixing, commingling and emulsification of the constituents. During this period the constituents in the apparatus are held at a temperature at which the oleaginous ingredients are maintained in solid but plastic form, and sufficiently but not excessively soft for satisfactory blending.

At the time that the principal constituents of the margarine are placed in the working apparatus the usual flavoring and preserving materials and other types of materials which it is the intention to incorporate, may also be introduced and worked directly into the emulsion at the same time that the emulsion is formed. These constituents may also be introduced after the emulsion is partially, or after the emulsion is completely formed.

Preferably, I also introduce into the blending apparatus a relatively small amount of a material capable of assisting in the formation of the margarine emulsion under the existing conditions. It will be understood, for example, that a substance which may have to be a true emulsifying agent and which may not assist in forming an emulsion when the substances are in liquid form may, however, be a very good emulsifying agent under the conditions existing during the practice of the process of the present invention. Among the substances which I may use for this purpose are so-called anti-spattering materials which function principally in margarine to reduce the spattering thereof during frying. Other types of substances are fats which have been treated to increase their affinity for water, such fats being sometimes referred to as hydrophyllic lipins. Certain hydrophyllic colloids, such as carbohydrate gums like acacia and tragacanth or pectin may be used to advantage, together with such natural products as egg yolks, brain or nerve tissue, or lecithin extracts prepared from either an animal or vegetable source. The substances referred to are merely illustrative as other substances for assisting in the formation of the emulsion may be employed.

After the emulsion has been made, it can be formed into prints immediately; preferably, with some slight cooling and allowing time to "set", as will be understood by those skilled in the art.

I shall now treat more fully of the various steps and the manner in which they are controlled.

The first matter for consideration is the selection of the oleaginous ingredients which are to go into the margarine. It is customary in the art to employ a mixture of fats and oils and this can be done readily in my invention. While I may introduce the various fats and oils directly into the working apparatus, I prefer first to compound the oleaginous materials outside the working apparatus and then introduce the oleaginous constituents in the mixed form. Many different treatments may be used for effecting the desired result, but in general it is found most satisfactory to melt the various constituents, mix them thoroughly while in the liquid condition and then cool them to maintain the mixture in a solid or plastic form. For cooling I can use a so-called lard roll in which a layer of the mixed fats and oils is deposited continuously onto a revolving refrigerated drum, and the product scraped from the drum as it is solidified.

Any of the usual formulæ may be used. For animal margarine, for example, I may use oleo oil, 40%; neutral lard, 45%, and cottonseed oil, 15%. For a strictly vegetable margarine I can use, for example, hydrogenated cocoanut oil (110 degrees F.) 10%; cocoanut oil (76 degrees F.) 80%, and cottonseed oil, 10%.

After the oleaginous constituent has been produced in the proper form, it can be introduced directly into the working apparatus, but if it is not at a substantially satisfactory temperature, this can be attained by tempering. The best temperature at which to maintain the oleaginous ingredients during the margarine forming step of the process varies. With the formula, for animal goods outlined above for example, a satisfactory temperature would be approximately 45 degrees F. The vegetable formula given above could best be worked at a temperature between 60 and 65 degrees F. Results may be obtained with these formulæ at other temperatures, but approximately the temperatures given will cause the margarine emulsion to be produced with a minimum of working and will produce the most satisfactory product.

The milk is prepared according to any of the customary processes now known. The so-called ripening may be attained by using a culture of a lactic acid producing organism, with or without the presence of other materials. Small amounts of a hydrophillic colloid may be introduced into the milk during the ripening step for the purpose of causing the formation of smaller curds than will be obtained by the use of the lactic acid organism alone. Anti-spattering agents may also be introduced into the milk for the purpose of causing the formation of small curds and also for the purpose of making relatively smaller amounts of the anti-spatterer effective to produce the anti-spattering result. In general, a proportion of most of the emulsifying agents can be introduced into the milk and in some cases the total amount of such agents can be introduced into the milk with good results.

The milk is ripened to the proper stage, usually determined by a test of the acid content thereof, and is then ready to be introduced into the blending apparatus with the oleaginous materials.

It will be understood that from the standpoint of the method, satisfactory results may be obtained by means of many different types of apparatus as long as the constituents are agitated together in such a way as to bring about a thorough inter-mixing action. Any of the usual kneading and mixing machines on the market are satisfactory for the purpose. A machine of the ordinary type for mixing bread dough, for example, can also be used. Apparatus such as the so-called Simplex churn may also be used. In general this form of apparatus consists of a large rotatable drum within which are supported reciprocally co-acting corrugated rollers spaced adjacent each other and the entire arrangement so disposed that the drum and rollers all rotate at the same time. The usual types of margarine blenders can also be used.

According to the preferred method of practicing the invention, when the main oleaginous and aqueous constituents are placed in the working apparatus the substances for assisting in the formation of the emulsion are also introduced. It has been shown that some or all of these substances may be introduced into the milk either before or after the ripening thereof. Some of these substances can also be introduced and melted or otherwise dispersed in the oleaginous materials before introducing the same into the blending apparatus; or the materials in suitable proportions may merely be placed in the blender and the working action of the apparatus depended upon to obtain proper dispersion.

Among the materials adapted for use in the practice of the invention are the anti-spattering substances described in patent application, Serial No. 475,622, filed August 15, 1930, by Benjamin R. Harris. These substances are in general chemical compounds having lipophile and hydrophile groups in such a state of balance as to reduce the spattering of the margarine during frying. A full disclosure of the manner in which these substances play this role can be had from the application. It is known that these substances, besides acting as anti-spatterers have some value as emulsifying agents. In fact some of the compounds which function as anti-spatterers are also very good emulsifying agents and aid very greatly in the formation of the margarine emulsion. They are water absorbent to some extent and aid in the binding of the moisture in the margarine so as to prevent leaking or "weeping" thereof.

More specifically the anti-spattering agents of the character referred to in Harris application comprise chemical compounds having balanced lipophile and hydrophile groups in which the lipophile group has at least four carbons. The lipophile group may be a higher fatty acid radical or any substance with a marked affinity for oils and fats. Example compounds, the characteristic radicals of which may constitute the lipophile group, are melissic acid, lauric acid, oleic acid, lauryl alcohol, palmityl alcohol, cholesterol, and the like. All that is necessary is that the group which is designated as the lipophile group have a distinct attraction or affinity for oleaginous substances.

The hydrophile group of the compound is represented by a radical having a distinct affinity for water, such as the characteristic radicals of phosphoric acid, sulphoacetic acid, sulphonic acid, and the like. It may also comprise a group having a number of free hydroxy radicals sufficient in amount to impart markedly hydrophyllic character to the group as a whole. Certain nitrogenous groups may also be employed as a hydrophile group of the compound.

Examples of anti-spattering compounds of this character and which can be employed with the invention are as follows:

| | Proportions used | Comparative anti-spattering powers |
|---|---|---|
| | Percent | |
| Cholesteryl ester of betaine hydrobromide | 0.2 | 100 |
| Potassium palmityl sulphate | 0.5 | 95 |
| $C_{27}H_{45}-O-\overset{O}{\underset{}{C}}-CH_2-\overset{Br}{\underset{}{N}}\langle\overset{H_3C}{\underset{CH_3}{}}\rangle$ (Carbocholesteroxy) methyl dimethylphenyl-ammonium bromide | 0.2 | 100 |
| Monostearine sulphoacetate sodium salt, (crude form) | 0.5 | 95 |
| Stearyl diethyleneglycol sulphoacetate, sodium salt | 0.1 | 95 |
| $CH_3-(CH_2)_{14}-CH_2-O-P\overset{O}{\underset{OH}{=}}-OH$ | 0.6 | 95 |
| $C_{17}H_{35}-\overset{O}{\underset{}{C}}-O-CH_2-CH_2-O-CH_2-CH_2-O-\overset{O}{\underset{OH}{P}}-OH$ (Stearyl diethyleneglycol dihydrogen orthophosphate) | 1.0 | 95 |

Each of these compounds has a lipophile group balanced by a hydrophile group. That is to say that the groups are in such a state of balance that neither dominates and the compound is neither distinctly lipophillic nor distinctly hydrophillic in character. These compounds apparently orientate themselves at the water oil interface of the margarine emulsion and so alter the water or aqueous constituent of the margarine that during frying the water boils off slowly and spattering due to violent or rapid vaporization of the water is avoided.

Another type of compound which can be used with very good results to assist in the formation of the emulsion are the hydrophyllic lipins described in application, Serial #474,308, filed August 9, 1930, by Benjamin R. Harris. These compounds also have lipophile and hydrophile groups, but not in a sufficient state of balance to affect the spattering behavior of the margarine. They have a very great effect, however, on the absorption and retention of the moisture so that by use of these compounds a margarine can be reproduced having as much as 18 or 20% of milk and being drier and less prone to leaking than can be obtained with only 10 to 12% of moisture without the hydrophyllic lipin. These substances are very valuable in the practice of my invention in enabling me to produce a very satisfactory margarine product in a relatively short time.

The compounds identified in the preceding paragraph as hydrophillic lipins contain both lipophile and hydrophile groups, but not in sufficient state of balance to prevent one of the groups dominating and imparting its own characteristic to the molecule as a whole. Such compounds are derivatives of polyhydroxy substances and have the general formula

wherein "$v$" and "$w$" are relatively small whole numbers, "[X](OH)" is a polyhydroxy radical with groups (RO) wherein "R" is an acyl, alkyl or some other substantially lipophillic group.

Of this class there are two sub-classes containing many important compounds. The first sub-class comprises hydrophillic higher alkyl and acyl derivatives of polyhydroxy substances which contain more than one free OH group but which will not prevent spattering. More specifically, under this group are the hydrophillic stearic acid esters of polyhydroxy compounds containing more than one free OH group. Of this class, an important compound, particularly adaptable for use in the present invention, is the monostearic acid ester of glycerol.

The second sub-class of compounds are hydrophillic alkyl and acyl derivatives of glycols. These compounds may have only one free OH group or they may have more than one free OH group, but the number of OH groups should not be sufficient to impart too marked a hydrophillic character to the molecule. The most important example under this class is monostearyl diethyleneglycol.

Examples of hydrophyllic lipins which can be used in the practice of my invention are mono-stearic acid ester of glycerine (monostearyl glycerol), monopalmitic acid ester of glycerol, monocetyl ether of glycerol, monomyristyl glycerol, monolauryl glycerol, monomyristyl diethylene glycol, monomelissyl diethylene glycol, monopalmityl glycerol, mono-oleyl diethylene glycol, mono-oleyl diglycerol, mono-oleyl glycerol, diethylene glycol mono-stearate, 1,6-dilauryl diglycerol, and their equivalents. I may also use alkyl and acyl derivatives of sugars such as dextrose, sucrose, and derivatives of mannitol, sorbitol, poly-glycerols and similar hydroxy compounds which have sufficient of the hydroxy groups esterified or combined with higher molecular weight lipophile groups to make the compound sufficiently oil wetting but insufficiently water wetting to "balance."

I prefer to use a combination of an antispatterer and hydrophyllic lipin together. A very satisfactory product is a mixture of monostearine sodium sulpho-acetate and monostearine in proportions of approximately ⅓ of the first and ⅔ of the latter. The first of these products is an anti-spattering substance of the kind described in the first of the co-pending applications referred to above and the monostearine is a hydrophyllic lipin without anti-spattering properties. I use this mixture in margarine in proportions of about .5% based upon the final margarine product.

The hydrophyllic colloids are preferably of a type capable of imbibing substantial amounts of moisture at room temperature. Vegetable carbohydrate gums, as for example gum acacia or gum tragacanth, are very valuable in this connection. They are introduced into the margarine in such a way as to obtain a thorough distribution or dispersion. I have found that the easiest way of accomplishing this is to partially hydrate the gums before introducing them, using for example some of the milk which will form the aqueous phase of the emulsion. This prevents the colloid from lumping up and forming relatively large aggregates, which would make it less effective as an emulsifying or moisture imbibing agent. If the margarine manufacturer chooses, he may first mix the gum with a relatively small amount of a non-aqueous dispersing medium such as a liquid oil, glycerine, salt or the like, to facilitate the dispersion of the gum in the aqueous medium.

In the use of egg yolks, either natural untreated yolks or prepared yolks may be used. The yolks may be introduced in a number of ways, and may even be preliminarily dispersed in the milk before the ripening of the milk. This permits the normal lecithin constituents of the yolk to perform an anti-spattering role in the finished margarine, and furthermore, a lesser amount of egg yolk is present than would normally be expected to prevent spattering.

Brain or nerve tissue is suited to the purpose and may be introduced into the margarine in various ways. It should first be prepared by thorough washing and treating to remove micro-organism which might possibly have a detrimental effect on the margarine, the heavy or stringy portion should be discarded and the remainder macerated to produce a final product of pasty consistency which may be further diluted by the addition of aqueous or oleaginous diluents. Brain and nerve tissue contains substantial proportions of lipoids sufficient, when the tissue is used in relatively large proportions, to reduce the spattering of the final margarine product.

Lecithin preparations may be used alone, but the best results are obtained by employing a relatively small amount of lecithin with other emulsifying agents such as the gums or hydrophyllic lipins.

Flavoring and preserving materials are added to the product at any suitable stage in the course of manufacture, or after manufacture of the emulsion has been completed. This product should be introduced, however, in such a way as to obtain a thorough distribution through the entire product. I prefer to operate the blending apparatus for a length of time until the formation of the emulsion has advanced to a stage where it is near completion, and then to introduce the flavoring and preserving ingredients, after which the blending is continued until the final product is produced. Among the substances introduced in this manner are salt and sodium benzoate, which enter into the manufacture of most margarine. Coloring matter also may be introduced at the same stage and in addition I may introduce substances for increasing the butter flavor and aroma of the margarine, such as the Diketone Products, described in the copending application of Epstein and Harris, Serial #475,634, filed August 15, 1930.

When the margarine has been completely processed to its final stage in the blending apparatus, it is treated further to fabricate it into suitable prints and is packaged in the customary manner. It may be necessary to chill the product to some slight extent before the prints are formed, although in some cases the prints may be formed directly without loss of time, the product passing directly from the blending apparatus to the printing stage. Those skilled in the art will understand this phase of the manufacture, without detail description thereof.

There are many advantages in connection with the process hereinabove described. In the old processes some milk was always lost, as, if a manufacturer wished to produce an article having 14% moisture, for example, he would use in the churn anywhere from 40 to 60% more moisture than he would wish to retain in the final product. This was occasioned by the fact that on the so-called butter workers, which were used to work the product to the proper stage of plasticity, a certain amount of moisture was always lost. Moreover, due to the fact that the salt and sodium benzoate and other similar materials were introduced into the margarine on the butter worker, larger amounts of these materials had to be used than would be expected to be incorporated in the final product. The obvious reason for this procedure was that as water or milk was worked out of the margarine, about one-half of the added salt or sodium benzoate would be dissolved in this lost milk or water and would be wasted. Since it was impossible to gauge beforehand the exact amount of salt and sodium benzoate that would be lost in this manner, the exact final percentage of these substances in the margarine was never entirely uniform.

In my process I use exactly the amount of milk which is to be present in the final product. Instead of working moisture out of the plastic product, the moisture is worked in and all of the milk so introduced is incorporated in the product. Similarly, all of the ingredients added, such as salt and sodium benzoate, are retained. This represents a large saving in materials alone in a margarine establishment, and also results in the production of a product, the final constituents of which can be accurately controlled. I have already referred to the saving in floor space, equipment and labor.

Although I refer to the word "margarine" throughout, I wish it understood that this term is used in its broadest sense to include emulsions of aqueous and oleaginous materials and designed as foods or ingredients of foods for shortening purposes, or for any other culinary use. The percentage of moisture may be varied between relatively wide ranges, the aqueous constituents may be milk, cultured or uncultured, or brine, and the product may be colored or uncolored, flavored or unflavored without departing from the scope of the invention. To produce the product known in the bakery trade as "puff paste", for example, milk as a general rule is not used, and the percentage of moisture is usually considerably less than in normal commercial margarine intended as a spread for bread.

Although I refer to the use of the invention with or without materials for assisting in the formation of the emulsion, it should be borne in mind that when the higher percentages of aqueous materials are to be present, the use of the emulsifying agents are preferred. When only a relatively small percentage of aqueous material is used, however, the invention may be practiced with or without the emulsifying agents.

The term "blend" as used in the claims refers to a working step in which aqueous material is worked into the margarine, as distinguished from "work", a term used in the industry to refer to a process in which moisture is kneaded or worked out of the margarine.

What I claim as new and desire to pro- tect by Letters Patent of the United States is:—

1. A method of producing margarine, which comprises introducing into a container a plastic oleaginous constituent, adding thereto an aqueous constituent, blending the oleaginous ingredient and aqueous constituent together to form an emulsion, and adding thereto a relatively small amount of a hydrophillic lipin having lipophile and hydrophile groups in an insufficient state of balance to affect the spattering behavior of the final margarine product.

2. A method of producing margarine, which comprises introducing into a container a plastic oleaginous constituent, adding thereto an aqueous constituent, blending the oleaginous ingredient and aqueous constituent together to form an emulsion, and adding thereto a mixture of an anti-spattering compound having balanced lipophile and hydrophile groups and a hydrophillic lipin having hydrophile and lipophile groups in an insufficient balance to affect the spattering behavior of the final margarine product.

3. A method of producing margarine, which comprises introducing into a container a plastic oleaginous constituent, adding thereto an aqueous constituent, blending the oleaginous ingredient and aqueous constituent together to form an emulsion, and adding thereto a relatively small amount of a mixture of monostearine sodium sulpho-acetate and monostearyl glycerol.

4. A method of producing margarine which comprises preparing a mixture of oils and fats suitable for use as the oleaginous constituent of the margarine, said mixture being solid at ordinary room temperature, treating the mixture at slightly elevated temperature to render the same plastic, introducing the mixture into a suitable container with a relatively smaller amount of an aqueous material and a small amount of a mixture of an anti-spattering compound having balanced lipophile and hydrophile groups, and a hydrophillic lipin having lipophile and hydrophile groups in an insufficient state of balance to affect the spattering behavior of the margarine, and kneading said materials together to form a final plastic margarine emulsion in which the oleaginous constituent is in the continuous phase.

5. A method of producing margarine which comprises preparing a mixture of oils and fats solid at room temperature, treating the mixture at a slightly elevated temperature to render the same plastic, introducing the plastic mixture into a container with a relatively smaller proportion of an aqueous constituent, and a hydrophillic lipin having the general formula $$(RO)_v[X](OH)_w$$

wherein "O" and "H" are oxygen and hydrogen respectively, "$v$" and "$w$" are relatively small whole numbers, $[X](OH)$ is a polyhydroxy radical with groups "$(RO)_v$" wherein "(R)" is an acyl, alkyl, or some other substantially lipophile group, and kneading the materials together to produce a final plastic margarine product in which the oleaginous constituent is in the continuous phase.

In witness whereof, I hereunto subscribe my name this 6th day of April, 1931.

MARVIN C. REYNOLDS.